(12) United States Patent
Marais

(10) Patent No.: US 10,507,924 B2
(45) Date of Patent: Dec. 17, 2019

(54) SEAT TRACK FITTING

(71) Applicant: Safran Seats, Plaisir (FR)

(72) Inventor: Jean-Charles Marais, Sainte Lizaigne (FR)

(73) Assignee: Saftran Seats, Plaisir (FR)

( * ) Notice: Subject to any disclaimer, the term of this patent is extended or adjusted under 35 U.S.C. 154(b) by 0 days.

(21) Appl. No.: 15/316,531

(22) PCT Filed: Jun. 26, 2015

(86) PCT No.: PCT/IB2015/054822
§ 371 (c)(1),
(2) Date: Dec. 6, 2016

(87) PCT Pub. No.: WO2015/198278
PCT Pub. Date: Dec. 30, 2015

(65) Prior Publication Data
US 2017/0197722 A1    Jul. 13, 2017

Related U.S. Application Data

(60) Provisional application No. 62/018,029, filed on Jun. 27, 2014.

(51) Int. Cl.
*B60N 2/07*      (2006.01)
*B64D 11/06*     (2006.01)
*A47B 91/08*     (2006.01)

(52) U.S. Cl.
CPC .......... *B64D 11/0696* (2013.01); *A47B 91/08* (2013.01); *B60N 2/07* (2013.01); *B60N 2/0732* (2013.01)

(58) Field of Classification Search
USPC ......... 248/424, 429; 296/65.01, 65.11, 65.13
See application file for complete search history.

(56) References Cited

U.S. PATENT DOCUMENTS 4,230,432 A    10/1980  Howell
4,449,875 A *   5/1984  Brunelle ............ B64D 11/0696
                                             244/118.5

(Continued)

FOREIGN PATENT DOCUMENTS

EP    2892805    7/2015
EP    3010751    4/2016

(Continued)

OTHER PUBLICATIONS

International Patent Application No. PCT/IB2015/054822, Search Report and Written Opinion, dated Sep. 25, 2015.

*Primary Examiner* — Alfred J Wujciak
(74) *Attorney, Agent, or Firm* — Kilpatrick Townsend & Stockton LLP; Dean W. Russell; Kristin M. Crall

(57) ABSTRACT

Embodiments of the present invention provide systems and methods for installing seats in a passenger vehicle using seat tracks and seat fittings. The seat track fittings may include a sleeve (22) with a cylindrical threaded opening (24), a double effect post (26) with an external lower thread (28) and an internal threaded portion (36). The external lower thread is configured to cooperate with the cylindrical threaded opening of the sleeve. The seat track fitting also has a track stud (38) with a lower flange (46) that is configured to cooperate with a seat track (10) and an upper external thread (42) configured to cooperate with the internal threaded portion of the double effect post. The double effect post external lower thread and the track stud external thread have inverse hands, such that rotation of the double effect post tightens the post and the track stud simultaneously.

19 Claims, 7 Drawing Sheets

(56) References Cited

U.S. PATENT DOCUMENTS

| | | | |
|---|---|---|---|
| 6,260,813 B1 | 7/2001 | Whitcomb | |
| 7,021,596 B2 | 4/2006 | Lory | |
| 7,975,979 B2 | 7/2011 | Bishop | |
| 8,182,183 B2 | 5/2012 | Cook et al. | |
| 8,602,702 B2 | 12/2013 | Roy et al. | |
| 2009/0099664 A1* | 4/2009 | Forrester | A61B 17/562 623/21.18 |
| 2010/0124457 A1 | 5/2010 | Cook et al. | |
| 2015/0284096 A1 | 10/2015 | De Morais et al. | |
| 2016/0107542 A1 | 4/2016 | Trimble et al. | |
| 2017/0129613 A1* | 5/2017 | Cailleteau | B64D 11/0696 |

FOREIGN PATENT DOCUMENTS

| | | |
|---|---|---|
| FR | 3005450 | 11/2014 |
| FR | 3005451 | 11/2014 |
| WO | 2014037884 | 3/2014 |
| WO | 2014205329 | 12/2014 |
| WO | 2015145409 | 10/2015 |
| WO | 2015198278 | 12/2015 |

\* cited by examiner

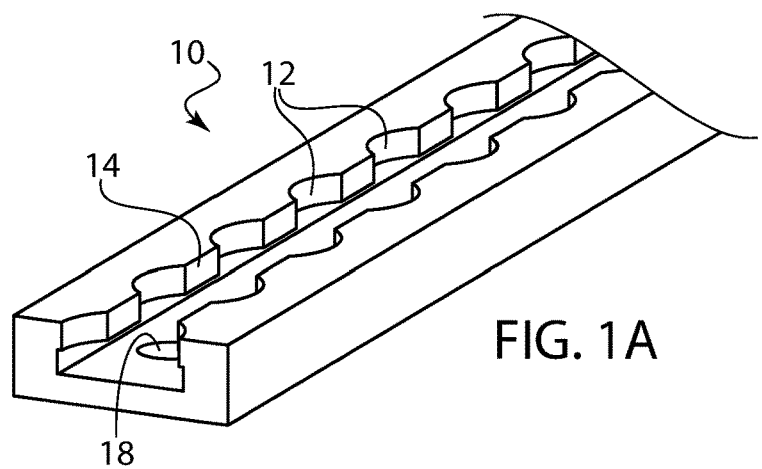
FIG. 1A
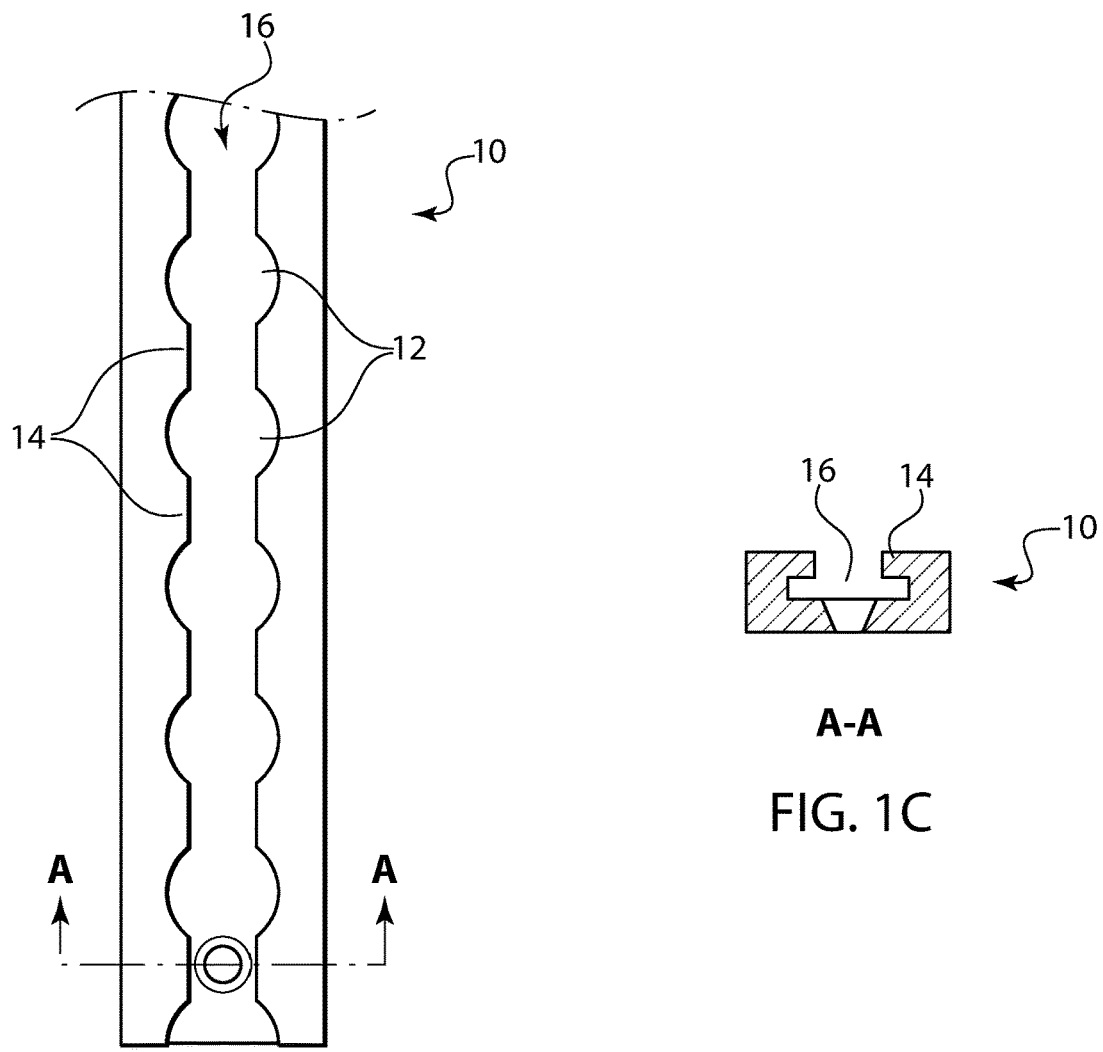
FIG. 1B
A-A
FIG. 1C

SEAT TRACK FITTING

CROSS REFERENCE TO RELATED APPLICATIONS

This application is the U.S. national phase entry of International Patent Application Serial No. PCT/IB2015/054822, filed on Jun. 26, 2015, which application claims the benefit of U.S. Provisional Application Ser. No. 62/018,029, filed Jun. 27, 2014, titled "Seat Track Fitting Turnbuckle," the entire contents the each of which are hereby incorporated by reference.

FIELD OF THE DISCLOSURE

Embodiments of the present disclosure relate generally to seat track fittings for aircraft seats. The seat track fittings are designed for ease of installation and tightening. The seat track fittings may also provide one or more break away features.

BACKGROUND

Many vehicle seats, such as those on passenger aircraft, buses, trains and the like, are removably mounted in a seat track 10 that is secured to the floor of the vehicle. For example, aircraft passenger seats are generally mounted on a track 10, as shown in FIG. 1. A track 10 is an elongated section that generally includes a series of equidistant semi-circular openings 12 with intermediate lip sections 14 therebetween. A channel space 16 typically spans the length of the track 10. The lip sections 14 have a smaller dimension than the openings 12. The lip sections 14 are generally machined to enable insertion of a lower part of a seat track fitting under the lip section 14. The seat track 10 is generally bolted or otherwise secured to the floor of the vehicle via a fastener that extends through a lower opening 18 in the track 10.

A seat fitting may be secured to a leg of the seat. In various examples, the seat fitting may incorporate a stud designed with a flared end that is attached to a narrower neck. The flared ends may be received under the lip sections 14 for securement of the seat. A bolt, lever, clamp, or wedge may be used to secure the seat fitting/seat with respect to the seat track 10. Other securement options include flanged fittings that secure the seat leg with respect to the track, or locking pins, cams, plungers, sliding fittings, or a number of other options. It is desirable to provide improved seat fittings that are more easily installed and removed, and well as improved seat fittings that can withstand torque that may be delivered to the seat in various conditions.

BRIEF SUMMARY

Embodiments of the invention described herein thus provide systems and methods for securing seats or other components to a seat track. Embodiments find particular use in passenger transportation vehicles.

In one example, the seat track fittings may include a sleeve with a cylindrical threaded opening, a double effect post with an external lower thread and an internal threaded portion. The external lower thread is configured to cooperate with the cylindrical threaded opening of the sleeve. The seat track fitting also has a track stud with a lower flange that is configured to cooperate with a seat track and an upper external thread configured to cooperate with the internal threaded portion of the double effect post. The double effect post external lower thread and the track stud external thread have inverse hands, such that rotation of the double effect post tightens the post and the track stud simultaneously.

Some examples provide a seat track fitting with a sleeve comprising a cylindrical threaded opening; a double effect post comprising an external lower thread and an internal threaded portion, the external lower thread configured to cooperate with the cylindrical threaded opening of the sleeve; and a track stud comprising a lower flange configured to cooperate with a seat track and an upper external thread configured to cooperate with the internal threaded portion of the double effect post, wherein the double effect post external lower thread and the track stud external thread have inverse hands.

For example, the double effect post external lower thread may be a left handed thread and the track stud upper external thread may be a right handed thread, or vice versa. The double effect post may have a head with a tool engagement feature. There may also be a pin configured to be received by an opening in the sleeve for securing the track stud rotationally in place with respect to the sleeve but allowing longitudinal movement of the track stud. The sleeve may have a post extending therefrom, and in some example, it may extend from a side of the sleeve.

The seat track fitting may also have a securement element with a sleeve contacting plate with a post-receiving opening, a seat leg interface part space, and an opposing plate with an opening. In use, a seat leg or a seat leg interface part may be received by the seat leg interface part space and a securing feature may secure the seat leg into place with respect to the securement element.

A specific example may provide a securement element or other portion of the seat track fitting that has a break over pivot stop feature. This feature may include tooth on the securement element and a corresponding indentation to receive the tooth on the seat leg (or the seat leg interface part), or vice versa.

Examples also provide a method for securing an aircraft seat to a vehicle floor, comprising installing a seat track on the vehicle floor, the seat track comprising one of more lip sections; providing a seat track fitting described herein; positioning the flange of the track stud underneath the one or more lip sections; tightening the double effect post into the sleeve using one turn or less of a tool, which causes the track stud to tighten into the sleeve and against the seat track.

BRIEF DESCRIPTION OF THE DRAWINGS

FIG. 1A shows a side perspective view of a seat track.

FIG. 1B shows a top plan view of the seat track of FIG. 1A.

FIG. 1C shows a front plan view of the seat track of FIG. 1A.

DETAILED DESCRIPTION

Figure 2A:
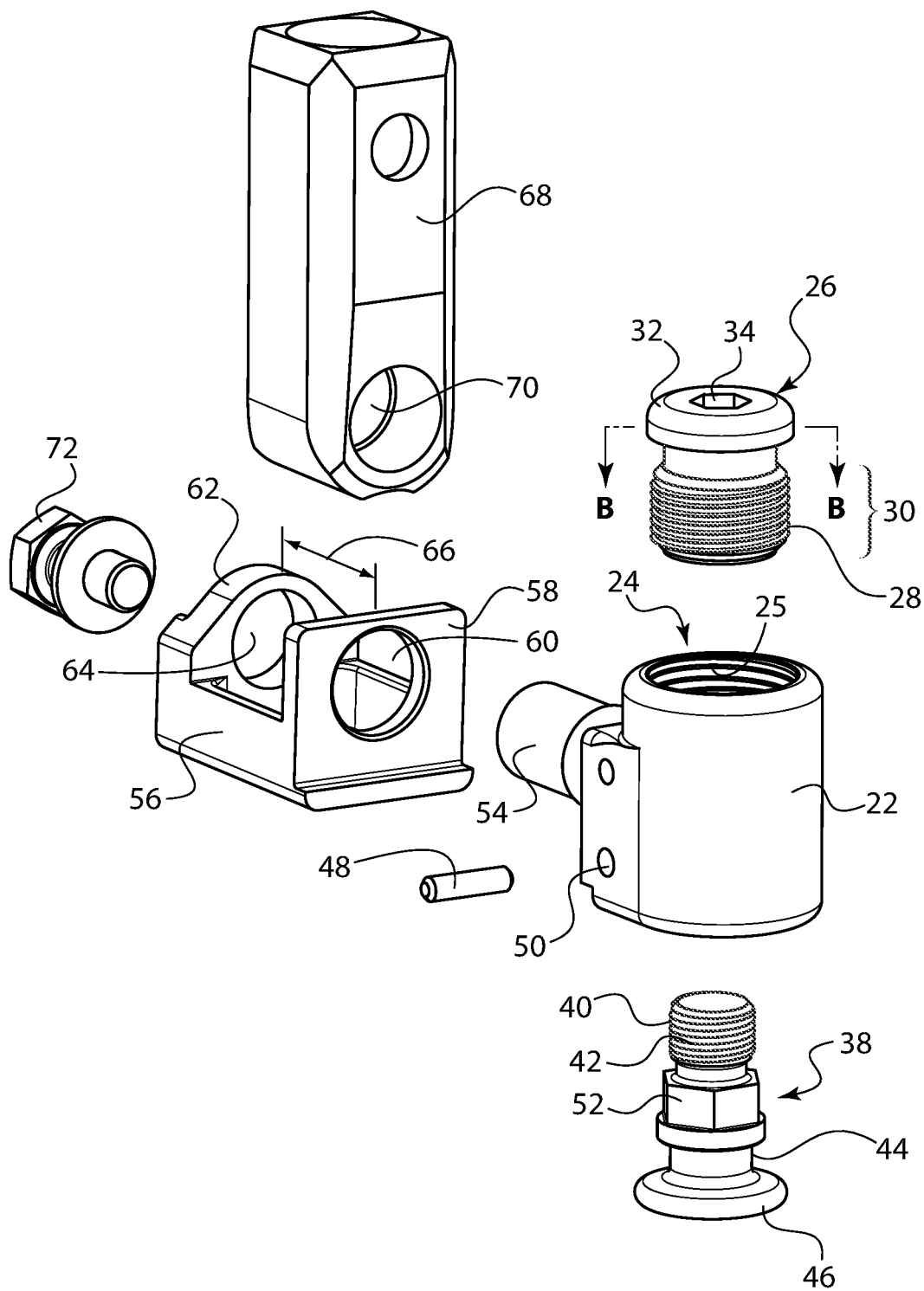
FIG. 2A shows a blown apart perspective view of one embodiment of a seat track fitting described herein.

Embodiments of the present invention provide systems and methods for securing a seat to a seat track. Particular embodiments are described with respect to securing an aircraft seat to an elongated seat track employed in an aircraft cabin. However, it should be understood that the disclosed systems and methods may be employed in a variety of other passenger travel applications, including other aviation and aerospace uses (e.g., helicopters or spacecraft), automotive technologies (e.g., trucks or RVs), marine technologies, railroad technologies, or any other industry that may seek to secure a seating device in place to a vehicle floor.

FIG. 1 illustrates one example of a seat track 10 that may be used in accordance with embodiments of the seat track fitting 20 described herein. The seat track 10 may be used to fix an aircraft seat to the aircraft floor. In use, the seat track 10 is attached to the aircraft floor. A seat track fitting 20 may cooperate with the seat track in order to attach an aircraft seat to the seat track 10. As shown, the seat track 10 may have a plurality of lip sections 14 that protrude into channel space 16. One of the seat track fittings 20 described herein may cooperate with the lip sections 14 in order to secure the seat track in place.

One of the goals for designing the seat track fitting 20 described herein was to provide a seat track fitting that could be tightened with a single tool and using a quarter turn. This is in contrast to other seat fittings, which generally require several turns in order to tighten the fitting. Another goal was to design a seat track fitting that could withstand "pitch and roll" tests, which are representative of floor deformation. Particularly for the rear attachment, it is desirable for transferring of longitudinal loads (for example in the event of a crash) from the seat to the seat track 10.

FIG. 2A illustrates one embodiment of a seat track fitting 20. It includes a sleeve 22 with an opening 24 therethrough. The sleeve 22 is shown as generally cylindrical in shape, but it should be understood that other configurations are possible and considered within the scope of this disclosure. Regardless of the outer shape of the sleeve 22, the opening 24 of the sleeve 22 will generally be cylindrical. The opening 24 may have a series of threads 25 extending along its internal surface.

Figure 2B:
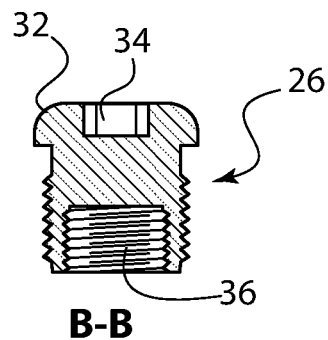
FIG. 2B shows a cut away view of a double effect post for FIG. 2A, showing its internal threads.

A double effect post 26 is configured to be received by the sleeve opening 24. The double effect post 26 has an external thread 28 along at least its lower portion 30. The head 32 of the double effect post 26 has a tool engagement feature 34. The tool engagement feature 34 may be designed to receive a hexagonal wrench, an allen wrench, a screwdriver, or any other appropriate tool. The double effect post 26 also has an internal threaded portion 36. This is shown in FIG. 2B. The internal threaded portion 36 has threads of an opposite hand than the external thread 28. For example, if the external thread 28 is a left hand thread, the internal threaded portion 36 is a right hand thread. Alternatively, if the external thread 28 is a right hand thread, the internal threaded portion 36 is a left hand thread.

A track stud 38 is configured to cooperate with the internal threaded portion 36. The track stud 38 has an upper portion 40 with an external thread 42. In use, the external thread 42 cooperates with the internal threaded portion 36 of the double effect post 26. The external thread of 42 is designed to have the same hand as the internal threaded portion 36. The track stud 38 also has a lower portion 44 with a flange 46. In use, the flange 46 may be received within the channel space 16 of the seat track 10. When tightened, the track stud 38 cooperates against the sleeve 22 in order to secure the seat track fitting 20 with respect to the seat track 10. In a particular example, the flange 46 may cooperate with a lip section 14.

Figure 3:
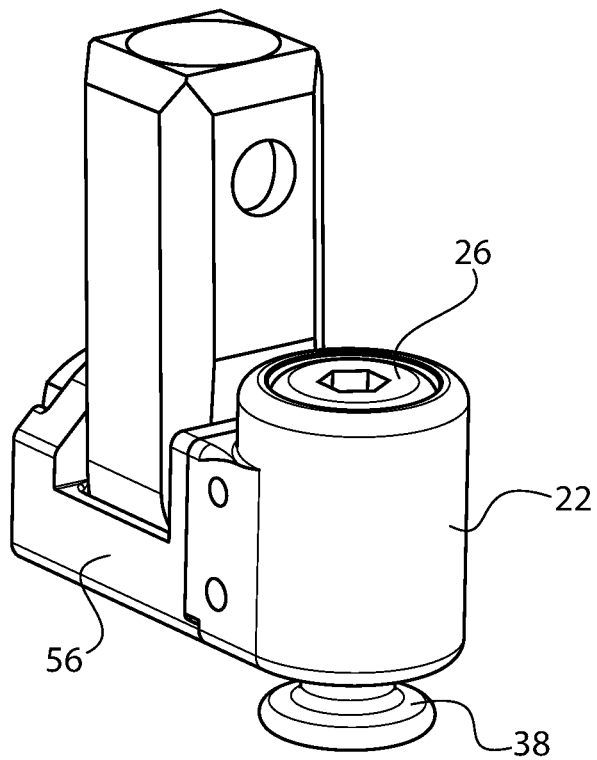
FIG. 3 shows the seat tack fitting of FIG. 2 in an assembled configuration, with a seat leg interface part secured in place.

When the seat track fitting 20 is tightened as shown in FIG. 3, the sleeve 22 receives the double effect post 26, and the double effect post 26 receives the track stud 38. The double effect post 26 and the track stud 38 have threads that are inverse with one another. This is similar to the principle of a turnbuckle. This configuration allows the seat track fitting 20 to be tightened with less than a single turn of a tool. The tightening motion in one direction tightens both the double effect post 26 as well as the track stud 38.

Figure 5:
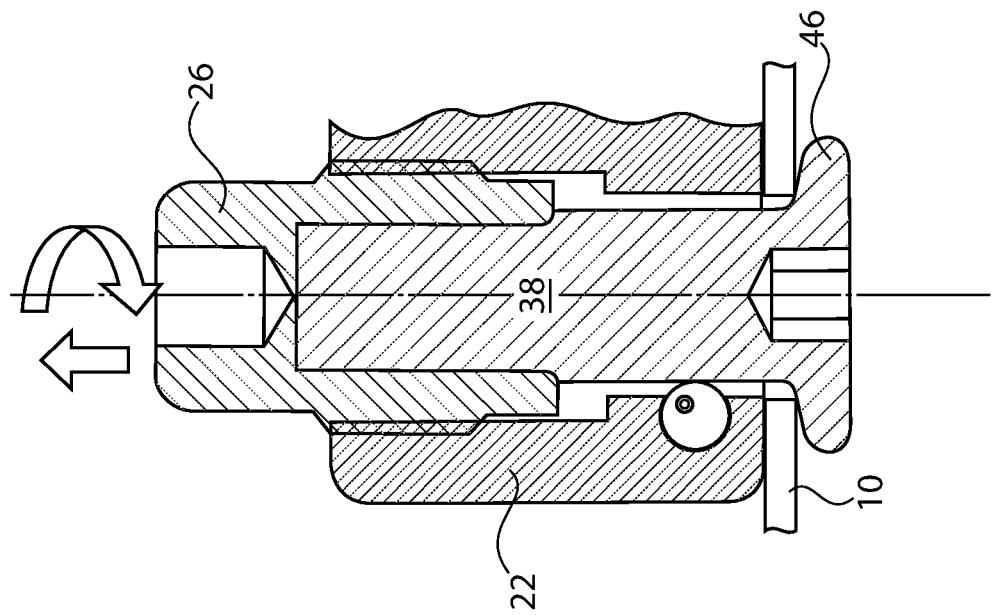
FIG. 5 shows a seat track fitting in a tightened configuration.
Figure 4:
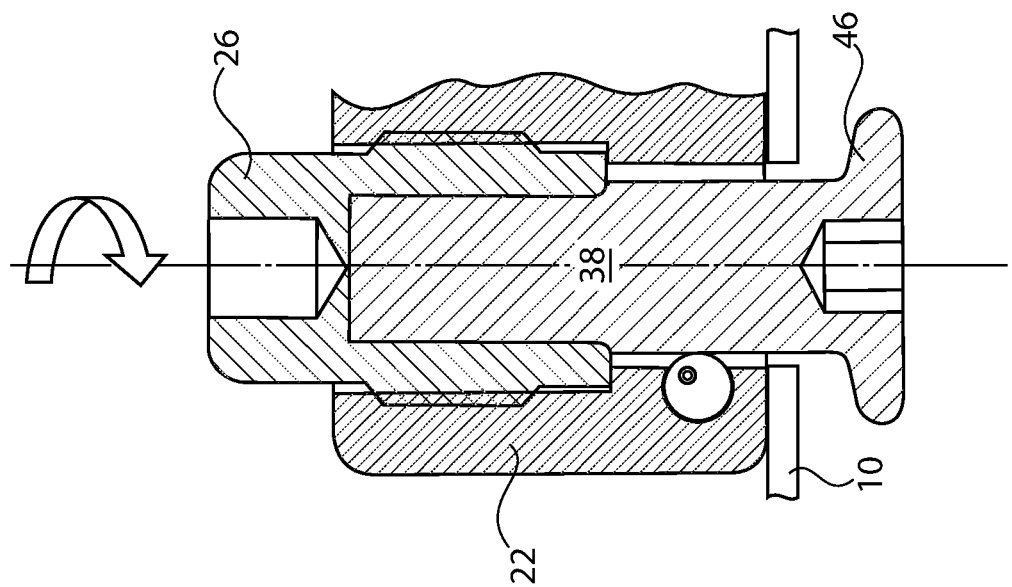
FIG. 4 shows a seat track fitting in an untightened configuration.

In one example, when the double effect post 26 is turned clockwise in the sleeve 22, it is caused to move upwardly with respect to the sleeve 22 and tighten the track stud 38 into the double effect post 26, such that the track stud 38 moves upwardly with respect to the seat track 10. This pinches the seat track 10 with respect to the flange 46 of the track stud 38 and the sleeve 22. An example of this is illustrated by the movement between FIG. 4 (which shows an untightened seat track fitting 20) and FIG. 5 (which shows a tightened seat track fitting 20). When the double effect post 26 is turned counterclockwise with respect to the sleeve 22, it is caused to move downwardly into the sleeve 22, loosening the track stud 38 downwardly as well. This releases the seat track fitting 20 from the seat track 10. An example of this untightened configuration is illustrated by FIG. 4.

In order to maintain the track stud 38 in the desired rotational position with respect to the sleeve 22, a pin 48 may be positioned in a side opening 50 of the sleeve 22. In use, the pin 48 contacts one of the faces 52 of the track stud 38. As shown, the track stud may have a bolt-like component or other component that provides a plurality of faces at or near its lower portion 44. Cooperation between the pin 48 and one of the faces 52 prevents the track stud 38 from rotating or turning with respect to the sleeve 22 when the double effect post 26 is tightened. When the seat fitting 20 is to be tightened and a tool turns the double effect post 26, if the track stud 38 is not secured from rotation, it would similarly rotate. Accordingly, the pin 48 provides a rotational stop when contacting the face 52. This allows the track stud 38 to engage in longitudinal movement (e.g., the raise or lower) but to not engage in rotational movement with respect to the sleeve 22. The track stud 38 can thus slide upwards or downwards with respect to the pin 48 upon rotation of the double effect post 26.

Figure 6:
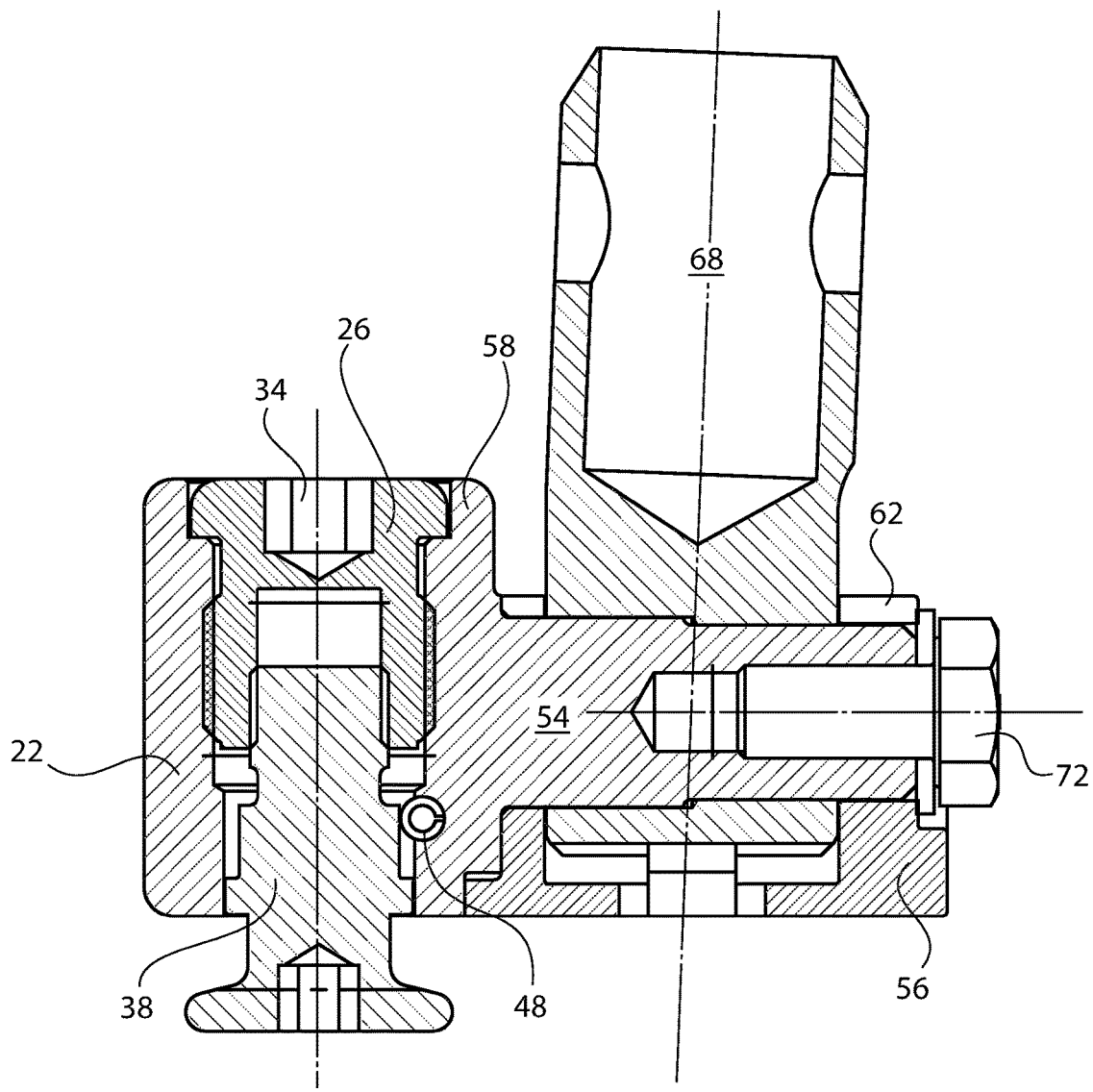
FIG. 6 shows a cut away view of the assembled seat track fitting of FIG. 3.

The sleeve 22 also has a post 54 extending from its body. The post 54 may be configured to be received by a securement element 56. As shown in FIG. 2 and the perspective view of FIG. 6, the securement element 56 may have a sleeve-contacting plate 58 with a post-receiving opening 60. The securement element 56 may have an opposing plate 62 with a similarly shaped opening 64. Between the plates 58, 62 may be a seat leg interface part space 66. Although two plates 58, 62 are shown and described, it should be understood that it is possible for the securement element 56 to have only a single sleeve-contacting plate 58.

In use, a seat leg or a seat leg interface part 68 may have an opening 70 with similar dimensions as openings 60, 64 of the securement element 56. The opening 70 of the seat leg interface part 68 may be aligned with the openings 60, 64 of the securement element. The seat leg interface part 68 may be a flange, a protrusion, or other interface part or component that secures to or otherwise cooperates with the seat leg. In another embodiment, the element that cooperates with the seat fitting 20 may the direct seat leg. Reference to a "seat leg" or a "seat leg interface part" herein are intended to include one or more interface parts of the seat leg or the seat leg itself. The post 54 of the sleeve 22 may be inserted through the post-receiving opening 60, the seat opening 70, and the opening 64 of the opposing plate 66. A securing feature 72 may be secured with respect to the post 54 in order to maintain alignment of the system. In one example, the post 54 may have an internal thread that receives a thread of the securing feature 72. The securing feature 72 may be inserted through plate opening 64, seat leg interface part opening 70, and plate opening 60, then into the post 54. A washer may be used to achieve the desired tension between the securing feature 72 and the securement element 56 and/or to prevent loosening. This washer may be a traditional washer, a spring washer, a rubber washer, or any other appropriate element. Additionally, other securing methods may be used and are considered within the scope of this disclosure.

Figure 7:
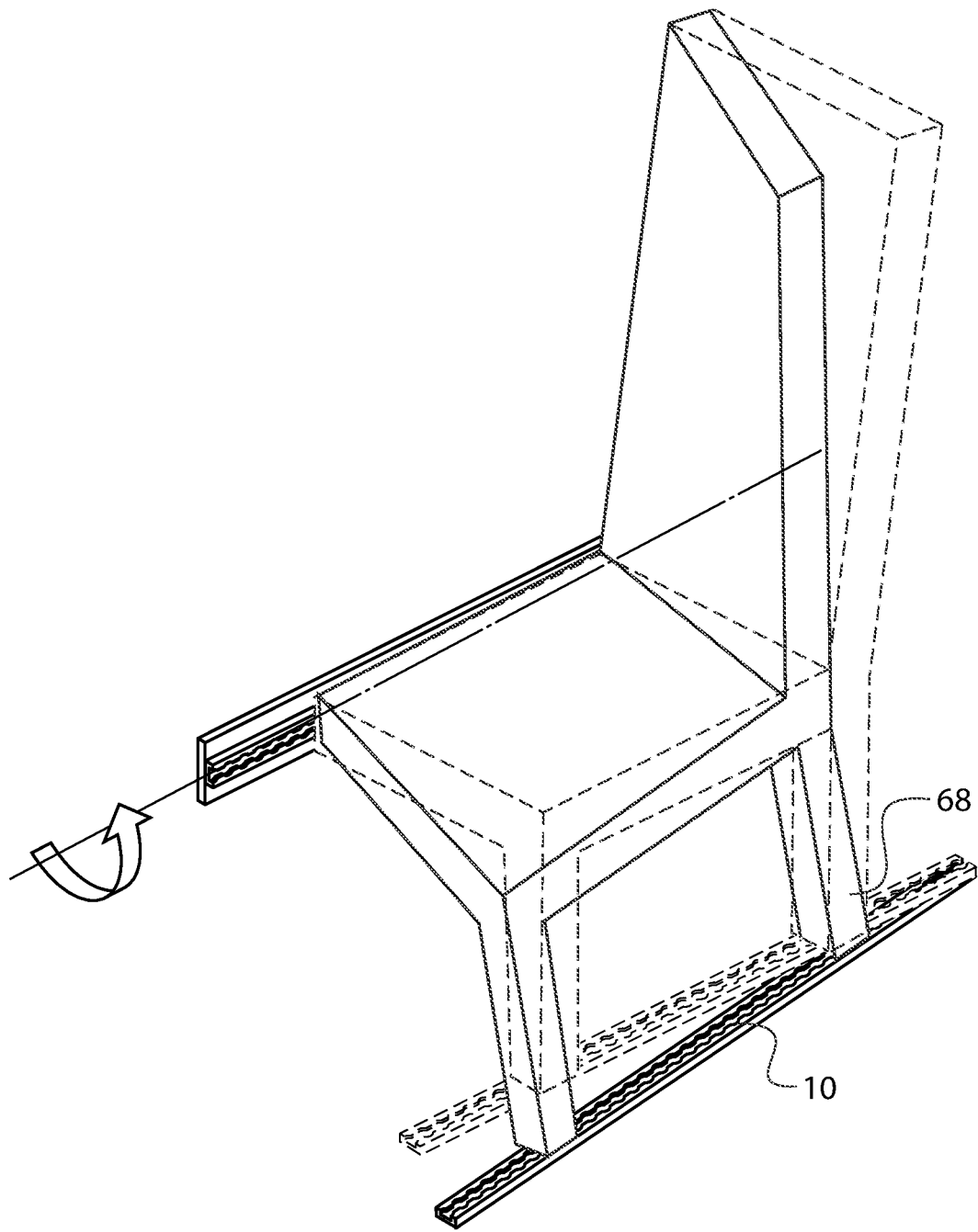
FIG. 7 shows a perspective view of a seat in a deformed condition.

In another embodiment, the post 54 of the sleeve 22 may be received directly by the opening 70 in the seat leg interface part 68, such that the securement element 56 is made optional. However, one benefit of the securement element 56 is that it allows rotation of the seat leg or seat leg interface part 68 upon application of torque to the seat. In the event of floor deformation, it is desirable for the seat track fitting 20 to be able to withstand forces without immediate cracking or failure. The seat may be deformed due to aircraft floor deformation, which could lead to slight rotation of the seat leg or seat leg interface part 68, as is shown in FIG. 7.

Figure 8:
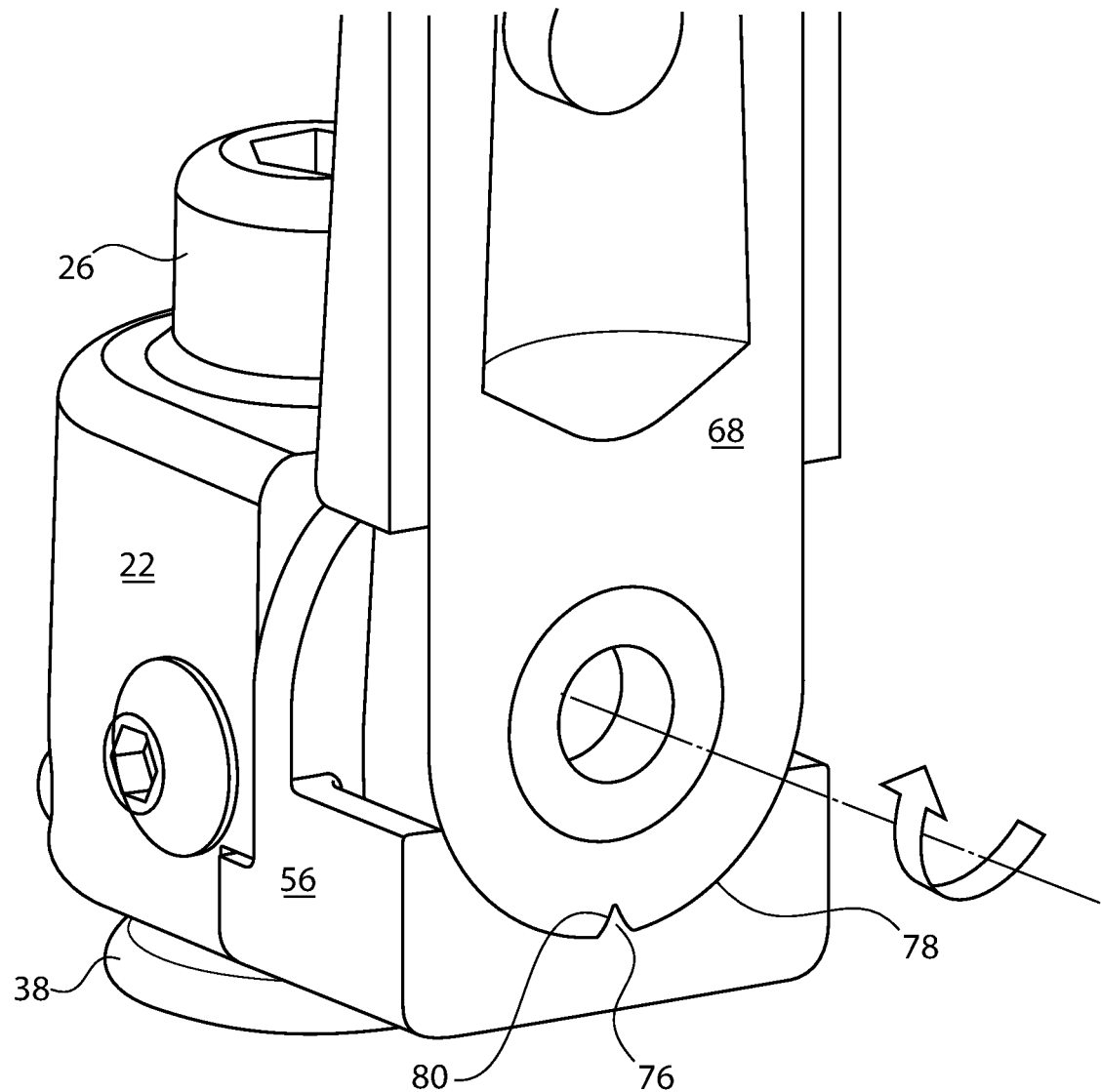
FIG. 8 shows a cut away view of a seat track fitting having a break away pivot stop feature.

In the event that undesirable rotation or torque is applied to the seat, for example in a crash condition, there may be provided a break-over pivot stop feature 74. In one example, this feature may be provided by a tooth 76 provided along a base 78 of the securement element 56. An example of this is illustrated by FIG. 8. The tooth 76 is received by a corresponding indentation 80 on the seat leg or seat leg interface part 68. During assembly of the seat fitting 20 with respect to the set leg or seat leg interface part 68, this feature 74 may assist with mounting and alignment. Once the seat is secured in place, the break-over pivot stop feature 74 may only break in the event of pitch and roll, which can cause deformation of the vehicle floor.

In the case of such an overload, the tooth 76 may break in order to allow the seat leg or seat leg interface part 68 to break free from the securement element 56/seat fitting 20 and to pivot with respect thereto. It is generally desirable that the seat leg be secured to the vehicle floor, but in the event of floor deformation, it is desirable to allow rotation of the seat leg (and/or seat leg interface part) with respect to the seat track 10. Accordingly, the tooth 76 may be designed with a strength that allows it to fracture or fail at a desired/planned overload. In another example, the securement element may be provided with the indentation and the seat leg or seat leg interface part may be provided with a tooth. Other breakable pivot-allowing features may be provided.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Accordingly, changes and modifications, additions and deletions may be made to the structures and methods recited above and shown in the drawings without departing from the scope or spirit of the disclosure or the following claims.

What is claimed is:

1. A seat track fitting, comprising:
   a sleeve comprising a cylindrical threaded opening;
   a double effect post comprising an external lower thread and an internal threaded portion, the external lower thread configured to cooperate with the cylindrical threaded opening of the sleeve; and
   a track stud comprising a lower flange configured to cooperate with a seat track and an upper external thread configured to cooperate with the internal threaded portion of the double effect post, wherein the double effect post external lower thread and the track stud external thread have inverse hands,
   further comprising a seat leg securement element, wherein the seat leg securement element comprises a sleeve-contacting plate with a post-receiving opening, wherein the sleeve further comprises a post, and wherein in use, the post-receiving opening receives the post, the sleeve-contacting plate is positioned against the sleeve, and a seat leg or a seat leg interface part is positioned against an opposite side of the sleeve-contacting plate.

2. The seat track fitting of claim 1, wherein the double effect post external lower thread comprises a left handed thread and the track stud upper external thread comprises a right handed thread.

3. The seat track fitting of claim 1, wherein the double effect post comprises a head with a tool engagement feature.

4. The seat track fitting of claim 1, further comprising a pin configured to be received by an opening in the sleeve for securing the track stud rotationally in place with respect to the sleeve but allowing longitudinal movement of the track stud.

5. The seat track fitting of claim 1, wherein the sleeve further comprises a post extending therefrom.

6. The seat track fitting of claim 5, wherein the post extends from a side of the sleeve.

7. The seat track fitting of claim 1, further comprising a securement element comprising a sleeve contacting plate with a post-receiving opening, a seat leg interface part space, and an opposing plate with an opening, wherein a seat leg or a seat leg interface part may be received by the seat leg interface part space and wherein a securing feature secures the seat leg or seat leg interface part into place with respect to the securement element.

8. The seat track fitting of claim 7, wherein the seat leg or seat leg interface part comprises an opening, wherein the sleeve comprises a post extending therefrom, and wherein the securing feature is received by the opening of the opposing plate, the opening of the seat leg or seat leg interface part, and the post-receiving opening.

9. The seat track fitting of claim 1, wherein a securing feature secures the seat leg or seat leg interface part with respect to the seat track fitting.

10. The seat track fitting of claim 1, wherein the securement element comprises a break over pivot stop tooth, and wherein the seat leg or seat leg interface part comprises a corresponding indentation to receive the tooth.

11. The seat track fitting of claim 1, wherein the seat leg or seat leg interface part comprises a break over pivot stop tooth, and wherein the securement element comprises a corresponding indentation to receive the tooth.

12. The seat track fitting of claim 1, further comprising a break-over pivot stop feature.

13. The seat track fitting of claim 12, wherein the break-over pivot stop feature comprises a raised protrusion tooth on a seat leg securement element that cooperates with a post of the sleeve.

14. A seat track fitting for securing a seat leg to a seat track, the seat track fitting comprising:
   a sleeve comprising a cylindrical threaded opening and a post extending from a side of the sleeve;
   a double effect post comprising an external lower thread and an internal threaded portion, the external lower thread configured to cooperate with the cylindrical threaded opening of the sleeve;
   a track stud comprising a lower flange configured to cooperate with a seat track and an upper external thread configured to cooperate with the internal threaded portion of the double effect post, wherein the double effect post external lower thread and the track stud external thread have inverse hands;
   a securement element comprising a sleeve-contacting plate with a post-receiving opening and a seat leg interface part space, wherein in use, the post of the sleeve is received by the post-receiving opening and where in the post extends into an opening of the seat leg or a seat leg interface part; and
   a securing feature configured to extend through the opening of the seat leg or seat leg interface part, through the post-receiving opening, and to secure against the post.

15. The seat track fitting of claim 14, wherein the post comprises internal threads that receive external threads of the securing feature.

16. The seat track fitting of claim 14, wherein the securement element further comprises an opposing plate with an opening, wherein the post-receiving plate and the opposing plate define the seat leg interface part space.

17. The seat track fitting of claim 14, where in the securement element further comprises a break over pivot stop feature.

18. The seat track fitting of claim 17, where in the break over pivot stop feature comprises a cooperation between a tooth and a corresponding indentation, one of which is on the securement element and one of which is on the seat leg or the seat leg interface part.

19. A method for securing an aircraft seat to a vehicle floor, comprising:
   installing a seat track on the vehicle floor, the seat track comprising one of more lip sections;
   providing a seat track fitting comprising:
      a sleeve comprising a cylindrical threaded opening and a post extending from a side of the sleeve;
      a double effect post comprising an external lower thread and an internal threaded portion, the external lower thread configured to cooperate with the cylindrical threaded opening of the sleeve;
      a track stud comprising a lower flange configured to cooperate with a seat track and an upper external thread configured to cooperate with the internal threaded portion of the double effect post, wherein the double effect post external lower thread and the track stud external thread have inverse hands;
      a securement element comprising a sleeve-contacting plate with a post-receiving opening and a seat leg interface part space, wherein in use, the post of the sleeve is received by the post-receiving opening and where in the post extends into an opening of the seat leg or a seat leg interface part; and
      a securing feature configured to extend through the opening of the seat leg or seat leg interface part, through the post-receiving opening, and to secure against the post;
   positioning the flange of the track stud underneath the one or more lip sections;
   tightening the double effect post into the sleeve using one turn or less of a tool, which causes the track stud to tighten into the sleeve and against the seat track.

* * * * *

UNITED STATES PATENT AND TRADEMARK OFFICE
CERTIFICATE OF CORRECTION

PATENT NO. : 10,507,924 B2
APPLICATION NO. : 15/316531
DATED : December 17, 2019
INVENTOR(S) : Jean-Charles Marais Page 1 of 1

It is certified that error appears in the above-identified patent and that said Letters Patent is hereby corrected as shown below:

On the Title Page

Item (73), change "Saftran Seats, Plaisir (FR)" to "Safran Seats, Plaisir (FR)"

Signed and Sealed this
Seventeenth Day of March, 2020

Andrei Iancu
*Director of the United States Patent and Trademark Office*